(12) United States Patent
Williams

(10) Patent No.: US 6,885,550 B1
(45) Date of Patent: Apr. 26, 2005

(54) SCREW LESS CLIP MOUNTED COMPUTER DRIVE

(75) Inventor: Dave Williams, El Paso, TX (US)

(73) Assignee: Axxion Group Corporation, El Paso, TX (US)

( * ) Notice: Subject to any disclaimer, the term of this patent is extended or adjusted under 35 U.S.C. 154(b) by 0 days.

(21) Appl. No.: 09/648,405

(22) Filed: Aug. 24, 2000

Related U.S. Application Data

(60) Provisional application No. 60/150,788, filed on Aug. 26, 1999.

(30) Foreign Application Priority Data

Sep. 7, 1999 (CN) ........................ 99244527 U

(51) Int. Cl.[7] ................................. G06F 1/16
(52) U.S. Cl. .................... 361/685; 361/727; 312/223.1; 312/223.2
(58) Field of Search ................................. 361/685, 684, 361/683, 686, 724–728, 802, 801, 732, 740, 747, 756; 312/223.1–333; 364/708.1

(56) References Cited

U.S. PATENT DOCUMENTS

| | | |
|---|---|---|
| 1,389,072 A | 8/1921 | Rosenberg |
| 3,066,367 A | 12/1962 | Garman |
| 3,996,500 A | 12/1976 | Coules |
| 4,495,380 A | 1/1985 | Ryan et al. |
| 4,532,546 A | 7/1985 | Aufiero et al. |
| 4,601,255 A | 7/1986 | Marcotti |
| 4,688,131 A | 8/1987 | Noda et al. |
| 4,694,380 A | 9/1987 | Mallory et al. |
| 4,807,557 A | 2/1989 | Lodisio |
| 4,896,777 A | 1/1990 | Lewis |
| 4,901,261 A | 2/1990 | Fuhs |
| 4,914,550 A | 4/1990 | Filsinger et al. |
| 4,960,384 A | 10/1990 | Singer et al. |
| 4,977,532 A | 12/1990 | Borkowicz et al. |
| 4,980,800 A | 12/1990 | Furuta |
| 5,003,431 A | 3/1991 | Imsdahl |
| 5,011,198 A | 4/1991 | Gruenberg et al. |
| 5,031,070 A | 7/1991 | Hsu |
| 5,032,952 A | 7/1991 | Cooke et al. |
| 5,067,041 A | 11/1991 | Cooke et al. |
| 5,098,175 A | 3/1992 | Cooke et al. |
| 5,100,215 A | 3/1992 | Cooke et al. |
| 5,112,119 A | 5/1992 | Cooke et al. |
| 5,116,261 A | 5/1992 | Lan et al. |
| 5,121,296 A * | 6/1992 | Hsu ........................ 361/685 |
| 5,142,447 A | 8/1992 | Cooke et al. |
| 5,164,886 A | 11/1992 | Chang |
| 5,175,670 A | 12/1992 | Wang |
| 5,216,582 A | 6/1993 | Rusell et al. |
| 5,222,897 A | 6/1993 | Collins et al. |
| D338,664 S | 8/1993 | Goff |
| 5,253,129 A | 10/1993 | Blackborow et al. |
| 5,262,923 A | 11/1993 | Batta et al. |
| 5,277,615 A | 1/1994 | Hastings et al. |

(Continued)

FOREIGN PATENT DOCUMENTS

| | | |
|---|---|---|
| CN | 0569-4811 | 4/2000 |
| JP | 406215553 A | 8/1994 |
| TW | 0569-4811 | 7/2000 |

*Primary Examiner*—Darren Schuberg
*Assistant Examiner*—Anthony Q. Edwards
(74) *Attorney, Agent, or Firm*—Gardere Wynne Sewell LLP

(57) ABSTRACT

A computer drive securing system comprising a chassis for receiving and supporting a computer drive unit by one or more securing clips. The chassis includes one or more pinholes and one or more clip mounting features. The securing clip includes one or more securing pins and one or more flexible tabs for engaging the pinholes and clip mounting features of the chassis, respectively. The pins project into a screw hole or the like in the computer drive for releasably securing the computer drive to the chassis.

17 Claims, 2 Drawing Sheets

U.S. PATENT DOCUMENTS

| | | |
|---|---|---|
| 5,297,009 A | 3/1994 | Gelez et al. |
| 5,299,095 A | 3/1994 | Feuerlein et al. |
| 5,299,944 A | 4/1994 | Larabell et al. |
| 5,302,965 A | 4/1994 | Belcher et al. |
| 5,305,180 A | 4/1994 | Mitchell et al. |
| 5,319,519 A | 6/1994 | Sheppard et al. |
| 5,321,962 A | 6/1994 | Ferchau et al. |
| 5,323,290 A | 6/1994 | Blair et al. |
| 5,325,263 A | 6/1994 | Singer et al. |
| 5,332,306 A | 7/1994 | Babb et al. |
| 5,333,097 A | 7/1994 | Christensen et al. |
| 5,340,340 A | 8/1994 | Hastings et al. |
| 5,379,184 A | 1/1995 | Barraza et al. |
| 5,392,192 A | 2/1995 | Dunn et al. |
| 5,406,300 A | 4/1995 | Tokimoto et al. |
| 5,452,184 A | 9/1995 | Scholder et al. |
| 5,460,441 A | 10/1995 | Hastings et al. |
| 5,481,431 A | 1/1996 | Siahpolo et al. |
| 5,495,389 A | 2/1996 | Dewitt et al. |
| 5,496,181 A | 3/1996 | Addison et al. |
| 5,502,604 A | 3/1996 | Furay |
| 5,510,955 A | 4/1996 | Taesang |
| 5,518,412 A | 5/1996 | Larabell |
| 5,524,104 A | 6/1996 | Iwata et al. |
| 5,535,093 A | 7/1996 | Noguchi et al. |
| 5,548,300 A | 8/1996 | Tokimoto |
| 5,557,499 A | 9/1996 | Reiter et al. |
| 5,564,585 A | 10/1996 | Saitoh |
| 5,566,383 A | 10/1996 | Gildea et al. |
| 5,571,256 A | 11/1996 | Giood et al. |
| 5,584,396 A | 12/1996 | Schmitt |
| 5,586,003 A | 12/1996 | Schmitt et al. |
| 5,587,856 A | 12/1996 | Aoyama |
| 5,587,881 A | 12/1996 | Wang |
| 5,587,889 A | 12/1996 | Sacherman |
| 5,588,728 A | 12/1996 | Eldridge et al. |
| 5,595,501 A | 1/1997 | Ho |
| 5,599,080 A | 2/1997 | Ho |
| 5,602,696 A | 2/1997 | Hanson |
| 5,612,854 A | 3/1997 | Wiscombe et al. |
| 5,652,695 A | 7/1997 | Schmitt |
| 5,652,697 A | 7/1997 | Le |
| 5,670,971 A | 9/1997 | Tokimoto et al. |
| 5,673,171 A | 9/1997 | Varghese et al. |
| 5,673,172 A | 9/1997 | Hastings et al. |
| 5,673,175 A | 9/1997 | Carney |
| 5,680,293 A | 10/1997 | McAnally et al. |
| 5,680,295 A | 10/1997 | Le et al. |
| 5,682,291 A * | 10/1997 | Jeffries et al. ............... 361/685 |
| 5,683,159 A | 11/1997 | Johnson |
| 5,687,059 A | 11/1997 | Hoppal |
| 5,694,266 A | 12/1997 | Bloom et al. |
| 5,708,563 A | 1/1998 | Cransion, III et al. |
| 5,713,647 A | 2/1998 | Kim |
| 5,721,668 A | 2/1998 | Barrus et al. |
| 5,721,669 A | 2/1998 | Becker et al. |
| 5,724,227 A | 3/1998 | Hancock et al. |
| 5,726,864 A | 3/1998 | Copeland et al. |
| 5,726,922 A | 3/1998 | Womble et al. |
| 5,730,515 A | 3/1998 | Ho |
| 5,734,557 A | 3/1998 | McAnally et al. |
| 5,737,185 A | 4/1998 | Morrison et al. |
| 5,748,157 A | 5/1998 | Eason |
| 5,751,547 A | 5/1998 | Honda et al. |
| 5,777,848 A | 7/1998 | McAnally |
| 5,779,496 A | 7/1998 | Bolinger et al. |
| 5,781,408 A | 7/1998 | Crane, Jr. et al. |
| 5,783,771 A | 7/1998 | Copeland et al. |
| 5,784,251 A | 7/1998 | Miller et al. |
| 5,785,402 A | 7/1998 | DeLorenzo |
| 5,788,211 A * | 8/1998 | Astier ........................ 248/674 |
| 5,790,372 A | 8/1998 | Dewey et al. |
| 5,790,373 A | 8/1998 | Kim et al. |
| 5,801,920 A | 9/1998 | Lee |
| 5,805,420 A | 9/1998 | Burke |
| 5,806,949 A * | 9/1998 | Johnson ................... 312/334.7 |
| 5,808,864 A | 9/1998 | Jung |
| 5,808,867 A | 9/1998 | Wang |
| 5,822,196 A | 10/1998 | Hastings et al. |
| 5,828,547 A * | 10/1998 | Francovich et al. ......... 361/685 |
| 5,833,480 A | 11/1998 | Austin |
| 5,845,978 A | 12/1998 | Jung et al. |
| 5,850,925 A | 12/1998 | Gandre |
| 5,852,739 A | 12/1998 | Radloff et al. |
| 5,865,518 A | 2/1999 | Jarrett et al. |
| 5,867,369 A | 2/1999 | Antonuccio et al. |
| 5,870,282 A | 2/1999 | Andre et al. |
| 5,875,068 A | 2/1999 | Sawada |
| 5,877,938 A | 3/1999 | Hobbs et al. |
| 5,886,869 A | 3/1999 | Fussell et al. |
| 5,896,273 A | 4/1999 | Varghese et al. |
| 5,914,854 A | 6/1999 | Holt |
| 5,914,855 A | 6/1999 | Gustafson et al. |
| 5,921,644 A * | 7/1999 | Brunel et al. ............. 312/223.2 |
| 5,924,780 A | 7/1999 | Ammon et al. |
| 5,926,916 A | 7/1999 | Lee et al. |
| 5,928,016 A | 7/1999 | Anderson et al. |
| 5,941,617 A | 8/1999 | Crane, Jr. et al. |
| 5,948,087 A | 9/1999 | Khan et al. |
| 5,949,652 A | 9/1999 | McAnally |
| D414,759 S | 10/1999 | Lu |
| D415,139 S | 10/1999 | Fu |
| 5,963,431 A | 10/1999 | Stancil |
| 5,973,918 A | 10/1999 | Feleman et al. |
| 5,973,934 A | 10/1999 | Roscoe |
| 5,993,241 A | 11/1999 | Olson et al. |
| 5,995,364 A * | 11/1999 | McCnally et al. .......... 361/685 |
| 6,017,106 A | 1/2000 | Adams et al. |
| 6,018,456 A | 1/2000 | Young et al. |
| 6,025,987 A * | 2/2000 | Allirot et al. ............... 361/685 |
| 6,037,876 A | 3/2000 | Crouch |
| 6,040,980 A | 3/2000 | Johnson |
| 6,094,342 A * | 7/2000 | Dague et al. ............... 361/685 |
| 6,118,668 A | 9/2000 | Scholder et al. |
| 6,122,173 A | 9/2000 | Feleman et al. |
| 6,124,552 A | 9/2000 | Boe |
| D433,022 S | 10/2000 | Lucas |
| 6,130,817 A | 10/2000 | Flotho et al. |
| 6,193,384 B1 | 2/2001 | Stein |
| 6,222,459 B1 | 4/2001 | Ting |
| D442,597 S | 5/2001 | Meyers et al. |
| 6,227,516 B1 * | 5/2001 | Webster et al. ............. 248/694 |
| 6,236,563 B1 | 5/2001 | Buican et al. |
| 6,246,571 B1 | 6/2001 | Lin et al. |
| 6,265,984 B1 | 7/2001 | Molinaroli |
| 6,270,046 B1 | 8/2001 | Lin |
| 6,272,009 B1 | 8/2001 | Buican |
| 6,275,382 B1 * | 8/2001 | Siedow et al. .............. 361/727 |
| 6,278,419 B1 | 8/2001 | Malkin |
| 6,299,266 B1 * | 10/2001 | Justice et al. ............ 312/223.2 |
| 6,370,022 B1 | 4/2002 | Hooper et al. |
| 6,456,489 B1 | 9/2002 | Davis et al. |
| 6,470,556 B2 | 10/2002 | Boe |
| 6,485,119 B1 | 11/2002 | Davis et al. |
| 6,486,858 B1 | 11/2002 | Altman |
| 6,582,150 B1 | 6/2003 | Davis et al. |
| 6,626,293 B2 | 9/2003 | St. Jeor |
| 2003/0210517 A1 | 11/2003 | Syring et al. |

\* cited by examiner

SCREW LESS CLIP MOUNTED COMPUTER DRIVE

CROSS REFERENCE TO RELATED APPLICATIONS

This application is a regular application claiming priority of U.S. Provisional application Ser. No. 60/150,788 filed Aug. 26, 1999.

BACKGROUND OF INVENTION

1. Field of Invention

This invention pertains to the design of a screw less, clip mounted computer drive. Specifically, in the present invention, a traditional drive mounting bracket or computer chassis is equipped with flexible tabs which secure a clip designed to engage and be locked into the standard screw holes located on the drive being attached.

2. Description of Prior Art

Historically, computer drives such as CD-ROMs, floppy disks, DVD drives and the like, were attached to the chassis of a computer using standard micro sized machine screws. While such method of attachment was secure and precise, it required significant amounts of labor. Further, even in the most careful of environments, damaged resulted to the other internal components of the computer due to dropped screws and tool slippage.

The perceived solution in the computer industry to the problems inherent in the screw type drive attachment means has been to incorporate separate drive rails in the chassis design which allowed the computer drive being attached to slide into and then be locked into place. Typical of this type of attachment are those inventions disclosed in U.S. Pat. Nos. 5,806,949; 5,801,920; 5,734,557; 5,599,080; 5,595,501; and 5,262,923. This solution, however, did not eliminate the use of micro sized machine screws to attach the rails to the computer drives. Additionally, use of rails necessitated the need for some type of electrical conductive grounding path between the metal drive housing and the metal computer chassis as disclosed on page 1, line 64 of U.S. Pat. No. 5,734,557. Since the rail method of attachment did not eliminate the need for micro sized machine screws and in fact created a need for additional grounding, this method has not reduced the costs and complexity of the traditional screw type assembly.

OBJECTS OF THE INVENTION

It is the object of the present invention to provide a means to attach a computer drive that is both easy as well as inexpensive. Furthermore, it is an object of the present invention to provide a computer drive attachment means that does not require the use of screws.

SUMMARY OF INVENTION

The present invention completely eliminates the needs for screws or assembly tools while installing a drive component into a computer chassis. In the present invention, a securing clip is used to fasten either one or more computer drives to a computer chassis. Although any number of securing clips can be used, the present invention utilizes at least two securing clips. The securing clips contain at least two securing pins which are small and long enough to fit through pin alignment holes in the computer chassis into the standardized screw holes present in the computer drive being installed. The securing clip of the present invention utilizes a securing clip with four (4) securing pins. The securing clips are then fastened to the computer chassis using any screw-less, conventional means of attachment such as glue, welds, Velcro® or two sided tape.

Although any screw-less, conventional means of attachment can be employed to attach the securing pins to the computer chassis, in the present invention, the securing clips are fastened to the computer chassis using clip mounting features. The securing clips are equipped with flexible tabs designed to engage clip mounting features attached to or formed from the computer chassis. The clip mounting features can be either formed directly from the computer chassis material or produced separately and attached to the computer chassis using any conventional means such as glue, welds, Velcro® or two sided tape, Once the securing clips have engaged the clip mounting features, the securing pins will be forced through the holes in the computer chassis into the standardized screw holes present in the drive being installed. Both the clip mounting features as well as the securing clip can be made from any material and of be any size so long as that when the two are engaged, the engagement is sufficient to form a secure computer drive attachment.

DETAILED DESCRIPTION OF THE INVENTION

Figure 1:
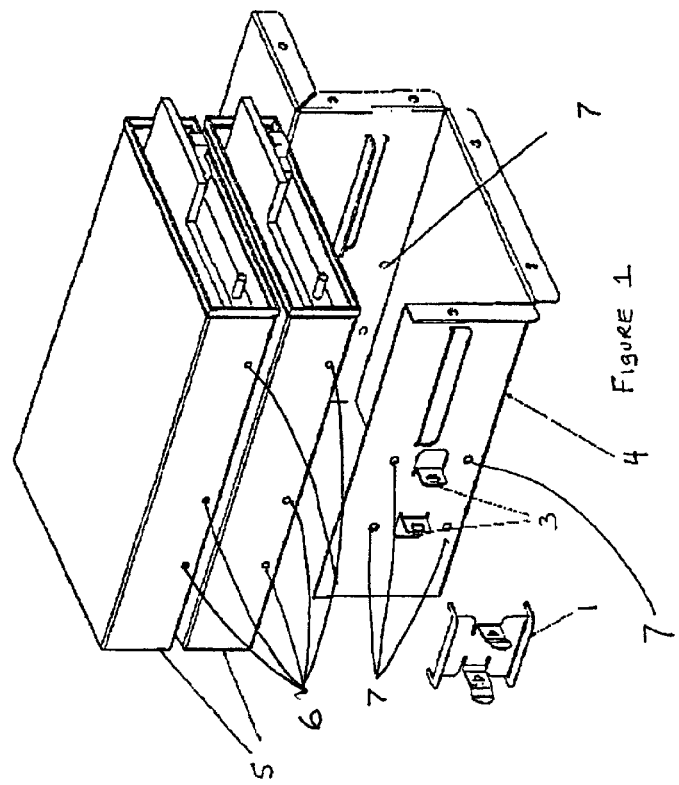
FIG. 1 is an exploded isometric view of the invention depicting two typical computer drives before installation into the computer chassis.

For a detailed description of the preferred embodiment of the present invention, please refer to FIGS. 1–4 in which like components are given like numbers for easy reference. FIG. 1 depicts the installation of two typical computer drives (5). Shown in FIG. 1 are the standardized screw holes (6) present on computer drives (5). The computer drives (5) are placed into the computer chassis (4) so that the standardized screw holes (6) are aligned with the pin alignment holes (7). The securing pins (2) of the securing clip (1) are positioned through the pin alignment holes (7) into the standardized screw holes (6). The securing clip (1) is attached to the computer chassis (4) using clip mounting features (3). The clip mounting features (3) engage flexible tabs (8) present on the securing clip (1).

Figure 3:
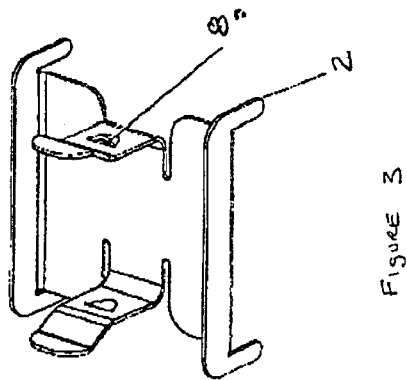
FIG. 3 is an isometric view of a securing clip with four securing pins.
Figure 2:
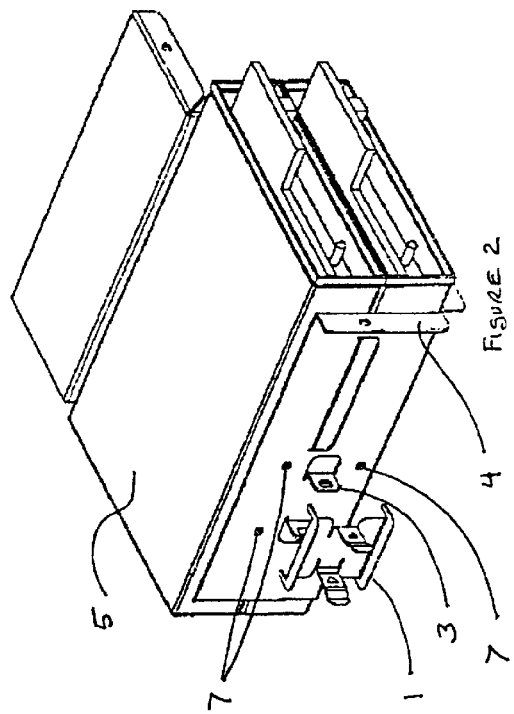
FIG. 2 is an isometric view showing 2 typical computer drives as installed into a computer chassis using the present invention.

FIG. 2 depicts the computer drives (5) after they have been installed into the computer chassis (4) but before the securing clip (1) has been attached to the clip mounting features (3). FIG. 3 shows an enlarged view of the flexible tabs (8) on the securing clip (1) along with the securing pins (2).

Figure 4:
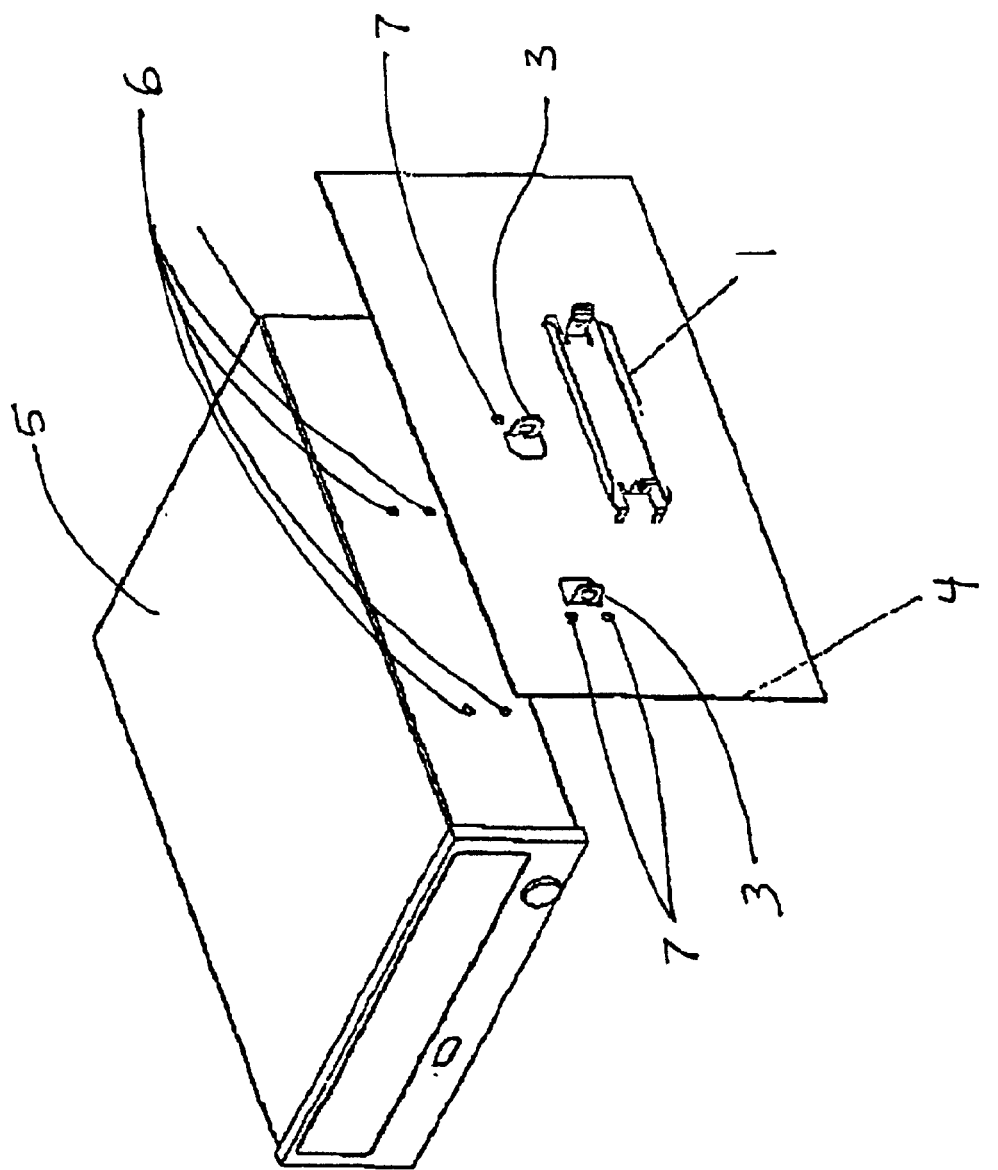
FIG. 4 is an isometric view of the installation of a single typical computer drive.

FIG. 4 shows the installation of one typical computer drive (5) in a computer chassis using the securing clips (1) with securing pins (2) inserted through pin alignment holes (7) into standardized screw holes (6). Also shown in FIG. 4 are the clip mounting features (3).

While the Invention has been described with reference to certain preferred characteristics, those skilled in the art will appreciate that certain changes and modifications can be made without departing from the scope and spirit of the Invention as defined by the following claims.

I claim:

1. A computer drive securing system comprising:
   a chassis, the chassis having at least one pinhole and at least one clip mounting feature projecting outwardly from the chassis; and
   a securing clip having at least one securing pin and at least one flexible tab for engaging said pinhole and said clip mounting feature of the chassis, respectively, said securing pin projecting through said pinhole and engageable with a computer drive supported on said chassis for securing said computer drive to said chassis.

2. The computer drive securing system of claim 1 wherein the clip mounting features are formed as a part of the chassis.

3. The computer drive securing system of claim 1 wherein the securing pins are of sufficient size to be projected through the pinholes of the chassis and into at least one screw hole of the computer drive.

4. The computer drive securing system of claim 1 wherein the securing pins are formed integral with from the securing clip.

5. The computer drive securing system of claim 1 wherein the flexible tabs are formed integral with the securing clip.

6. The computer drive securing system of claim 1 wherein the flexible tabs are configured to be deflected by and engaged with the clip mounting features of the chassis.

7. A method of securing a computer drive to a chassis having at least one pinhole and at least one pin mounting clip feature projecting outwardly from the chassis comprising the steps of:
   sliding the computer drive into the chassis such that rails formed in the chassis engage grooves formed in the computer drive, and such that at least one screw hole on the computer drive aligns with at least one pinhole on the chassis;
   aligning a securing clip having at least one securing pin and at least one flexible tab with the pinholes of the chassis;
   passing the securing pin through the pinholes of the chassis and the screw holes of the computer drive such that the securing pin simultaneously engages the chassis and the computer drive; and
   engaging the flexible tabs to at least one clip mounting bracket formed as part of the chassis such that the securing clip is removably fastened to the chassis thereby securing the computer drive.

8. A computer drive securing system comprising:
   a chassis, the chassis having at least one pinhole and at least one clip mounting feature, projecting outwardly from the chassis, formed as a part of the chassis; and
   a securing clip having at least one securing pin and at least one flexible tab for engaging the pinhole and the clip mounting feature of the chassis, respectively, the securing pin projecting through the pinhole and engageable with a computer drive supported on the chassis for securing the computer drive to the chassis.

9. The computer drive securing system of claim 8 wherein at least one securing pin is of sufficient size to be projected through a pinhole of the chassis and into at least one screw hole of the computer drive.

10. The computer drive securing system of claim 8 wherein at least one securing pin is formed integral to the securing clip.

11. The computer drive securing system of claim 8 wherein at least one flexible tab is formed integral with the securing clip.

12. The computer drive securing system of claim 8 wherein at least one flexible tab is configured to be deflected by and engaged with at least one clip mounting feature of the chassis.

13. A computer drive securing system comprising:
   a chassis, the chassis having at least one pinhole and at least one clip mounting feature projecting outwardly from the chassis; and
   a securing clip having at least one securing pin formed integral to the securing clip and at least one flexible tab for engaging the pinhole and the clip mounting feature of the chassis, respectively, the securing pin projecting through the pinhole and engageable with a computer drive supported on the chassis for securing the computer drive to the chassis.

14. The computer drive securing system of claim 13 wherein at least one clip mounting feature is formed as a part of the chassis.

15. The computer drive securing system of claim 13 wherein at least one securing pin is of sufficient size to be projected through a pinhole of the chassis and into at least one screw hole of the computer drive.

16. The computer drive securing system of claim 13 wherein at least one flexible tab is formed integral with the securing clip.

17. The computer drive securing system of claim 13 wherein at least one flexible tab is configured to be deflected by and engaged with at least one clip mounting feature of the chassis.

* * * * *